(12) United States Patent
Clouteau et al.

(10) Patent No.: US 12,254,996 B2
(45) Date of Patent: Mar. 18, 2025

(54) METHOD OF DETERMINATION OF A NUCLEAR CORE LOADING PATTERN

(71) Applicant: FRAMATOME, Courbevoie (FR)

(72) Inventors: Thibaut Clouteau, Lyons (FR); Markus Wicklein, Bubenreuth (DE)

(73) Assignee: FRAMATOME, Courbevoie (FR)

( * ) Notice: Subject to any disclaimer, the term of this patent is extended or adjusted under 35 U.S.C. 154(b) by 260 days.

(21) Appl. No.: 17/786,516

(22) PCT Filed: Dec. 16, 2020

(86) PCT No.: PCT/EP2020/086501
§ 371 (c)(1),
(2) Date: Jun. 16, 2022

(87) PCT Pub. No.: WO2021/122802
PCT Pub. Date: Jun. 24, 2021

(65) Prior Publication Data
US 2023/0035729 A1 Feb. 2, 2023

(30) Foreign Application Priority Data

Dec. 17, 2019 (EP) .................................... 19306672

(51) Int. Cl.
*G21D 3/00* (2006.01)
*G21C 19/20* (2006.01)

(52) U.S. Cl.
CPC .............. *G21D 3/002* (2019.01); *G21D 3/004* (2019.01); *G21C 19/205* (2013.01)

(58) Field of Classification Search
CPC ....... G21D 3/002; G21D 3/004; G21C 19/205
(Continued)

(56) References Cited

U.S. PATENT DOCUMENTS 4,759,897 A * 7/1988 Tolino .................... G21C 17/06
376/245
2004/0196946 A1 10/2004 Chao et al.
(Continued)

FOREIGN PATENT DOCUMENTS

EP 3919890 B2 5/2007
EP 1909292 A1 4/2008
(Continued)

OTHER PUBLICATIONS

Corresponding Search Report for PCT/EP2020/086501.
(Continued)

*Primary Examiner* — Jack W Keith
*Assistant Examiner* — Daniel Wasil
(74) *Attorney, Agent, or Firm* — Davidson Kappel LLC

(57) ABSTRACT

A method of determination of a nuclear core loading pattern defining the disposition of fuel assemblies. The method includes defining at least one potential core loading pattern and calculating predictive bowing of the fuel assemblies at the end of the operation cycle for each potential core loading pattern. The calculation is carried out by an automatic learning algorithm trained on a training data set that includes a plurality of other core loading patterns. The set also includes, for each of the other core loading patterns, measurements of bowing of fuel assemblies at the end of operation cycle. The method also includes evaluating the at least one potential core loading pattern based on the predictive bowing calculations and at least one predetermined criteria. The method further includes selecting one of the potential core loading patterns based at least in part on the evaluating.

13 Claims, 4 Drawing Sheets

(58) Field of Classification Search
USPC .................................................. 376/245, 267
See application file for complete search history.

(56) References Cited

U.S. PATENT DOCUMENTS

| | | |
|---|---|---|
| 2005/0086036 A1 | 4/2005 | Kropaczek et al. |
| 2006/0109944 A1 | 5/2006 | Popa |
| 2006/0149514 A1 | 7/2006 | Kropaczek et al. |
| 2010/0254502 A1 | 10/2010 | Ahlfeld et al. |
| 2011/0069801 A1 | 3/2011 | McWhirter et al. |
| 2011/0110483 A1 | 5/2011 | Greenspan et al. |
| 2016/0329116 A1 | 11/2016 | Grossetete |
| 2018/0254109 A1* | 9/2018 | Cheatham .............. G21D 3/001 |

FOREIGN PATENT DOCUMENTS

| | | | |
|---|---|---|---|
| JP | H1184071 A | 3/1999 | |
| JP | 2005114728 A | 4/2005 | |
| RU | 2527425 C2 | 8/2014 | |
| RU | 2549178 C2 | 4/2015 | |
| RU | 2555363 C9 | 10/2015 | |

OTHER PUBLICATIONS

Corresponding Search Report for EP19306672.7.
Shinya Ishida et al: "Finding the Best Fuel Assemblies Shuffling Scheme of ADS for MA transmutation Using Dynamic Programming," Nuclear Engineering and Design 240 (2010), journal homepage:www.elsevier.com/locate/nucengdes, Tokyo Institute of Technology, Department of Nuclear Engineering, pp. 3645-3653.

\* cited by examiner

METHOD OF DETERMINATION OF A NUCLEAR CORE LOADING PATTERN

The present disclosure relates to a method of determination of a nuclear core loading pattern.

BACKGROUND

A pressurized water reactor comprises a vessel and a core positioned inside the vessel. The core is composed of a plurality of nuclear fuel assemblies, each fuel assembly extending in an axial direction, preferably vertically, the fuel assemblies being arranged side-by-side. Upon loading the fuels assemblies into the vessel for forming the core, the fuel assemblies are disposed according to a core loading pattern defining the position of each fuel assembly in the core for the next operation cycle of the nuclear plant.

Each fuel assembly includes a bundle of nuclear fuel rods supported by a support skeleton comprising spacer grids designed to maintain the fuel rods in a spaced relationship transversely to the axial direction of the fuel assembly. Each rods include a cladding containing nuclear fuel pellets.

In operation, pressurized water flows inside the vessel and through the core, for example from bottom to top of the core, the coolant fluid retrieving heat from the fuel assemblies. The coolant ensure cooling of the fuel assemblies and moderation of the nuclear reaction in the core.

During operation of the reactor, mechanical deformations of the fuel assemblies of the core can occur.

These deformations vary from one fuel assembly of the core to the other, e.g. as a function of the position of the fuel assembly in the core and/or as a function on whether the fuel assembly is fresh or has already been irradiated in at least one preceding operation cycle, or contains fresh fuel rods and/or fuel rods that have already been used in at least one preceding operation cycle [to be confirmed].

These deformations of the fuel assemblies are likely to disrupt the operation and performance of the reactor: risk of incomplete insertion of control clusters, which make it possible to adjust the reactivity of the core of the nuclear reactor, or risk of unacceptable increase in the drop time of the control clusters, or risk of local variation of the moderation of the core, etc.

During maintenance, for example during unloading and reloading operations of the core, these deformations increase the risks of catching between fuel assemblies and thus the risk of damaging fuel assemblies.

It is therefore important to take these possible deformations in account when defining a core loading pattern.

To this end, it is known to compute the flow of the coolant fluid inside the vessel and the mechanical deformation of the assemblies using finite elements mechanical models and coupled fluid-structure Computer Fluid Dynamics (CFD) models.

However, these calculations are highly time-consuming and require important calculation resources. For example, CFD calculations for only one core loading pattern to be tested currently take one week.

Therefore, it is known to define a core loading pattern based on some constraints. When the core loading pattern is designed, the potential fuel assemblies deformations issues are only checked a posteriori.

SUMMARY

One aim of the present disclosure is therefore to propose a method of determination of a nuclear core loading pattern which takes better into account the constraints due to the fuel assemblies deformation and therefore to enhance the reactor safety during operation or maintenance of the nuclear reactor. In particular, that will allow to rely on a complete calculation process instead of a hybrid process based on calculation but also on engineering experience input.

To that end, the present disclosure provides a method of determination of a nuclear core loading pattern defining the disposition of fuel assemblies in the nuclear core for an operation cycle of a nuclear plant, the method comprising at least the following steps:

definition of at least one potential core loading pattern, calculation of predictive bowing of the fuel assemblies at the end of the operation cycle for each potential core loading pattern, the calculation being carried out by an automatic learning algorithm trained on a training data set comprising a plurality of others loading patterns and, for each of them, the measures of bowing of fuel assemblies at the end of cycle, evaluation of the at least one core loading pattern based on the predictive bowing calculations and at least one predetermined criteria, and selection of one of the potential core loading patterns.

According to other advantageous aspects of the present disclosure, the method comprises one or more of the following features, considered alone or according to all technically possible combinations:

the method comprises, after the step of evaluation, if the evaluation fails, a repetition of the previous steps, with at least one different potential core loading pattern;

a plurality of potential core loading patterns are defined, the step of selection of one of the potential core loading patterns being based at least on the predictive bowing calculations and on the at least one predetermined selection criteria;

the definition of the at least one potential core loading pattern is carried out as a function of the characteristics of the operation cycle and of the fuel assemblies and as a function of the core design safety limits.

at least one of the predetermined criteria is chosen among the group consisting in: minimal and/or maximal clearance between two fuel assemblies, maximal bowing amplitude of each fuel assemblies, and average bowing severity of each fuel assemblies;

the plurality of potential core loading patterns comprises at least four core loading patterns, notably more than ten core loading patterns;

the training dataset comprises data issued from fuel assemblies burned during operation in a nuclear plant;

the training dataset comprises data issued from bowing calculations carried out on fuel assemblies, such as finite elements mechanical calculations and coupled fluid-structure Computer Fluid Dynamics calculations; and the automatic learning algorithm is based on a neural network.

The present disclosure also provides a computer program product including software instructions which, when executed by a computer, carry out a method as defined above.

BRIEF SUMMARY OF THE DRAWINGS

The present disclosure also provides a method of loading fuel assemblies in a nuclear core comprising at least the following steps:

selection of a core loading pattern by a method of determination as defined above, and loading the fuel assemblies in the nuclear core according to the selected core loading pattern.

Figure 1:
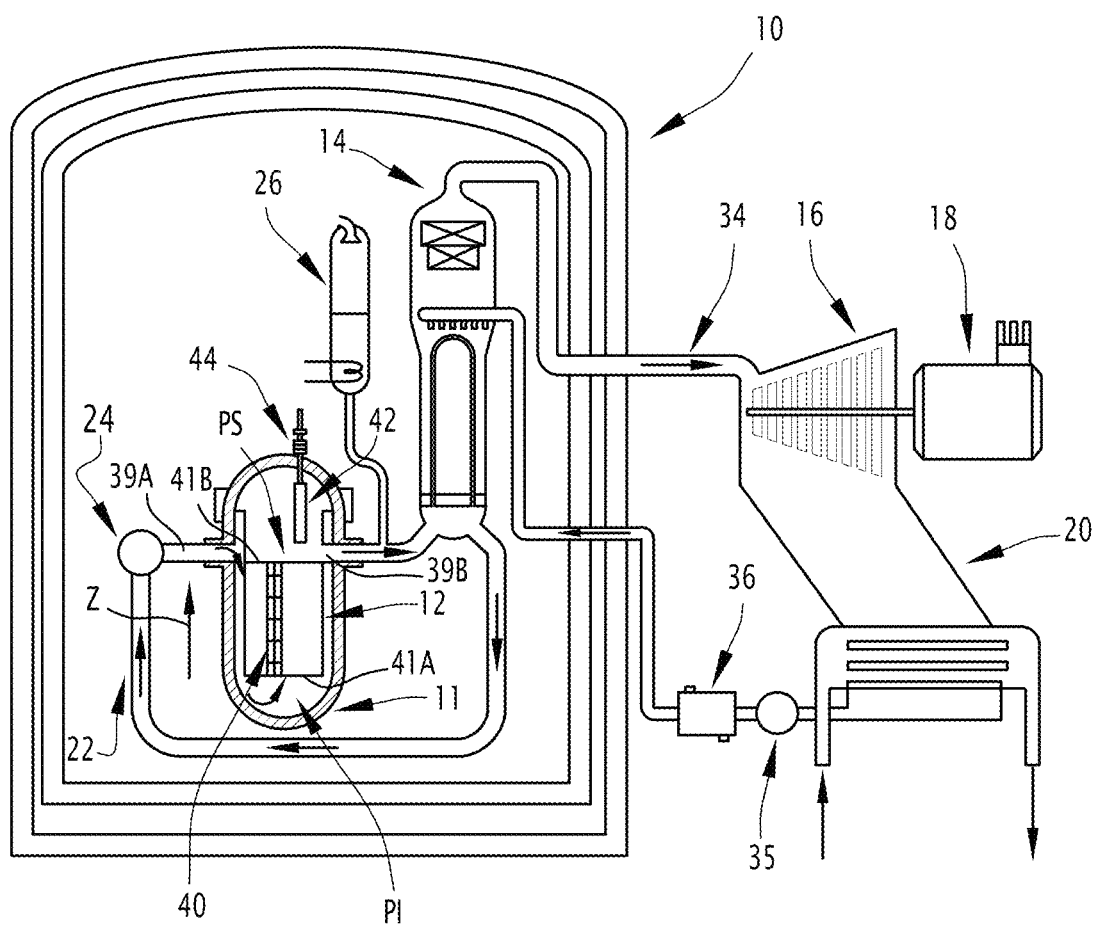
Figure 2:
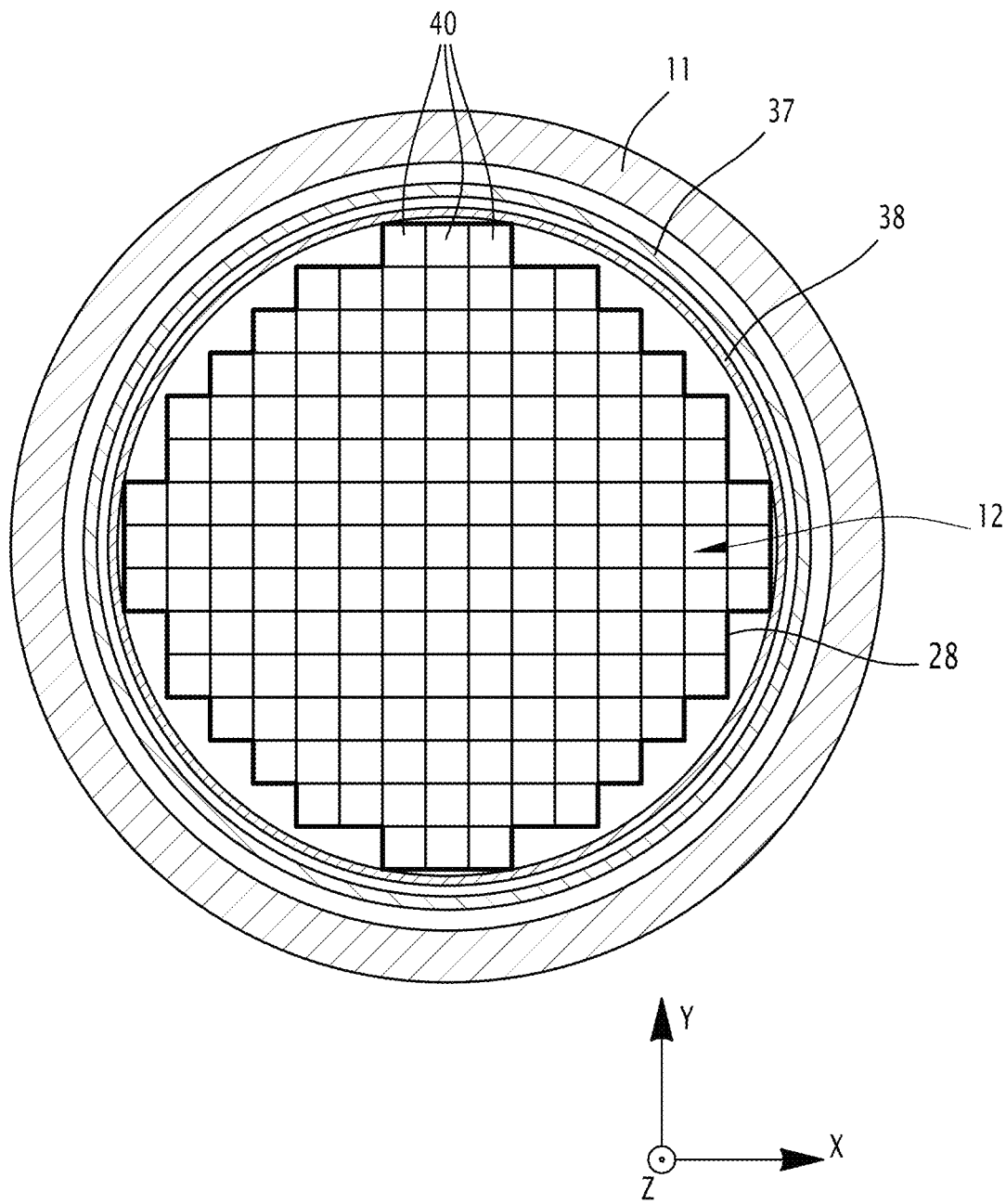
Figure 3:
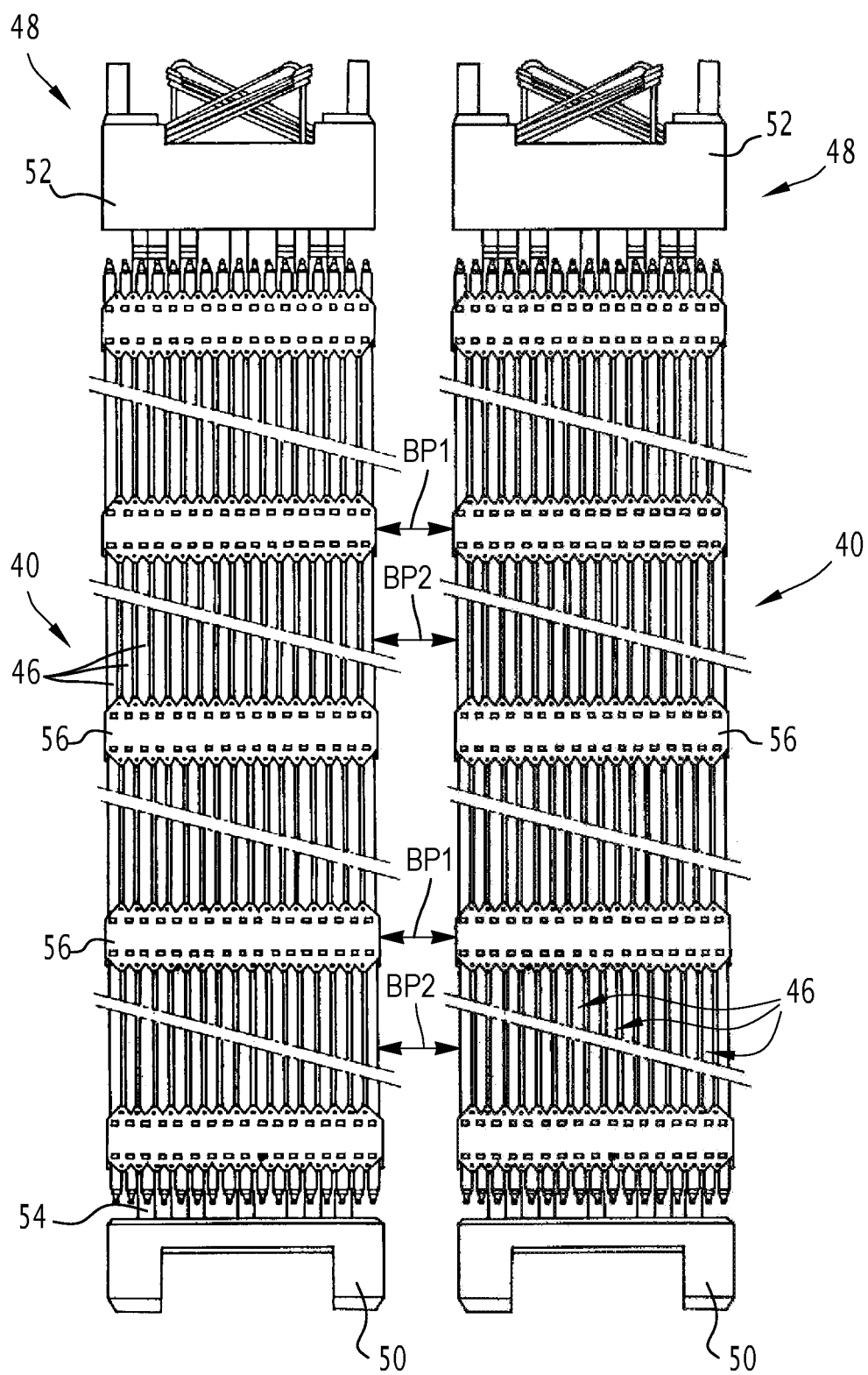
Figure 4:
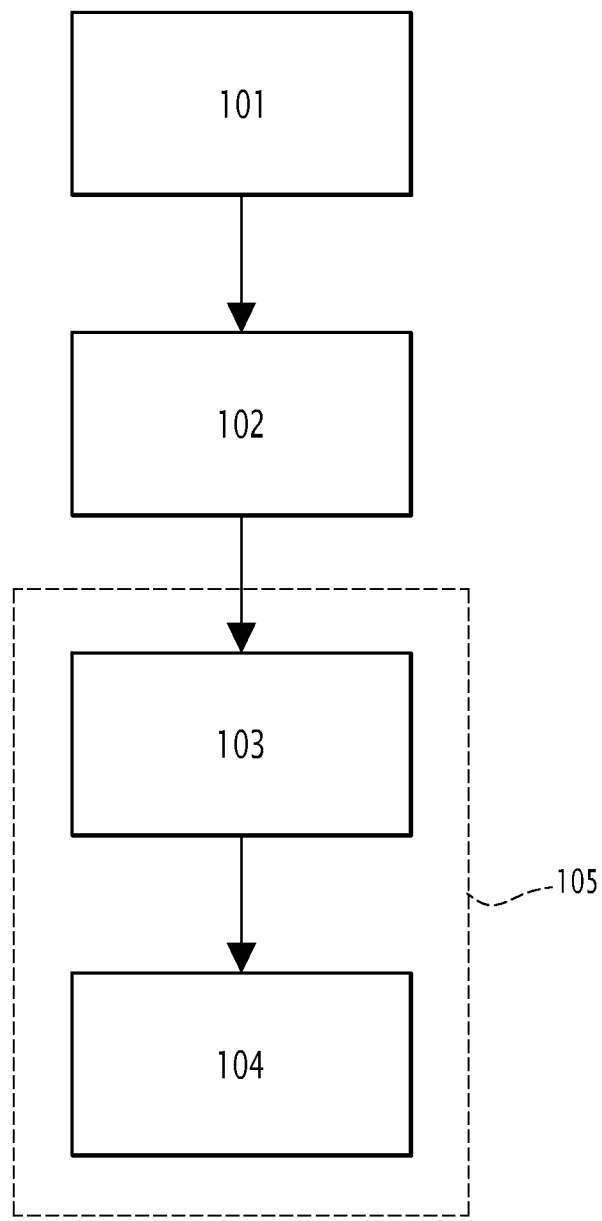

The features and advantages of the present disclosure will appear upon reading the following description, provided solely as a non-limiting example, and done in reference to the appended drawings, in which:

FIG. 1 is a diagrammatic illustration of a pressurized water nuclear reactor, including a vessel and a core positioned inside the vessel, the core including nuclear fuel assemblies, FIG. 2 is a horizontal sectional view, at the core, of the reactor of FIG. 1, FIG. 3 is a diagrammatic view of two assemblies of the core of FIG. 1, and FIG. 4 is a flowchart of the method of determination according to the present disclosure.

DETAILED DESCRIPTION

In FIG. 1, a nuclear reactor 10 comprises a vessel 11 and a core 12 positioned inside the vessel 11.

The nuclear reactor 10 also comprises one or more steam generators 14, one or more turbines 16 each coupled to an electricity generator 18, and one or more condensers 20, only one of each of these elements being shown in FIG. 1.

The nuclear reactor 10 further comprises a primary circuit 22 equipped with pumps 24 and in which a fluid flows as illustrated by the arrows in FIG. 1.

This fluid in particular flow upwardly inside the vessel 11 and through the core 12 to be heated therein while ensuring cooling of the core 12 and moderation of the nuclear reaction in the core 12.

The primary circuit 22 further comprises a pressurizer 26 making it possible to regulate the pressure of the fluid flowing in the primary circuit 22.

The nuclear reactor 10 is, for example, a pressurized water reactor (PWR), and the fluid flowing in the primary circuit 22 is then pressurized water.

Alternatively, the nuclear reactor 10 is a boiling water reactor (BWR), and the fluid flowing in the primary circuit is then pressurized water, in the form of steam in the upper part of the core, the pressure generally being lower than that of the water flowing in the primary circuit of the pressurized water reactor. Alternatively, the nuclear reactor 10 is a reactor cooled with sodium, molten salts or gas.

The nuclear reactor 10 comprises a secondary circuit 34 connected to the steam generator 14. The fluid of the primary circuit 22 supplies the steam generator 14, where it is cooled by ensuring vaporization of water of the secondary circuit 34, the steam produced by the steam generator 14 in the secondary circuit 34 being channeled by the secondary circuit 34 for the turbine 16, then for the condenser 20, where that steam is condensed by indirect heat exchange with the cooling water flowing in the condenser 20. The secondary circuit 34 comprises, downstream from the condenser 20, a pump 35 and a heater 36.

The nuclear reactor 10 comprises a heat shield 37, an enclosure of the core 38 and a reflector 28, shown in FIG. 2 and positioned inside the vessel 11.

The vessel 11 includes an inlet orifice 39A for the fluid and an outlet orifice 39B for the fluid, the inlet and outlet orifices 39A, 39B being connected to the primary circuit 22.

The core 12 is formed of a plurality of nuclear fuel assemblies 40 that are loaded in the vessel 11. Each fuel assembly 40 is elongated along an axial direction. The fuel assemblies 40 are arranged side-by-side in the core with their axial directions being parallel between them and generally parallel to the vertical direction Z.

The core 12 typically comprises more than one hundred fuel assemblies 40. In the example of a 900 MWe reactor illustrated in FIG. 2, the core 12 comprises one hundred and fifty seven (157) fuel assemblies 40.

FIG. 2 shows a top view of an example of the distribution of these different assemblies 40 within the core 12. Each square in FIG. 2 embodies one respective fuel assembly 40.

This distribution of the fuel assemblies 40 defines a core loading pattern. Each fuel assembly 40 of the core 12 is individually identified and the core loading pattern defines the respective position of each fuel assembly 40 inside the core 12. The core loading pattern defines in particular the suitable configuration of fresh and already irradiated fuel assemblies.

The reactor 10 also comprises a lower plate 41A and an upper plate 41B positioned on either side of the assemblies 40 in the axial direction when the reactor 10 is operating, the assemblies 40 are deposited on the lower plate 41A and the upper plate 41B is positioned above the assemblies 40, in contact with their upper end, as shown in FIG. 1.

The reactor 10 comprises control clusters 42, shown in FIG. 1, that are positioned in the vessel 11 above certain assemblies 40. One single cluster 42 is shown in FIG. 1. The clusters 42 are movable by mechanisms 44 to be inserted into the assemblies 40 that they overhang, or to be removed therefrom. Traditionally, each control cluster 42 comprises absorbent rods that include one or more materials absorbing neutrons, and optionally inert rods, i.e., rods that have no specific absorption capacity with respect to neutrons. The vertical movement of the clusters 42 makes it possible to adjust the reactivity in the core 12 and allows variations of the overall power P supplied by the core 12 from the zero power to the nominal power PN, as a function of the insertion of the control clusters 42 into the fuel assemblies 40.

As illustrated by FIG. 3, each fuel assembly 40 comprises an bundle of nuclear fuel rods 46 and a support skeleton 48 supporting the fuel rods 46. The skeleton 48 comprises for example a lower end-piece 50, an upper end-piece 52, guide-tubes 54 connecting the two end-pieces 50, 52, and spacer grids 56 distributed along the guide-tubes 54 for maintaining the rods 46. Each guide-tube 54 is intended to receive a respective rod of the control cluster 42 upon insertion thereof into the core 12.

FIG. 3 shows two adjacent assemblies 40, i.e. two assemblies 40 corresponding to adjacent squares in a horizontal plane perpendicular to the axial direction Z, in the illustration of FIG. 2. The two adjacent assemblies 40 are positioned successively and spaced apart from one another, in a transverse direction, by a first clearance BP1 between the respective grids 56 of the two assemblies 40 and by a second clearance BP2 between the respective rods 46 of the two assemblies 40, as shown in FIGS. 3 and 5.

In FIG. 2, the assemblies 40 are substantially aligned in two respective directions X, Y in the horizontal plane perpendicular to the vertical direction Z, and one skilled in the art will understand that when the two successive assemblies 40 are aligned in the direction X, then the transverse direction associated with the first and second clearances BP1, BP2 corresponds to that direction X. Similarly, when the two successive assemblies 40 are aligned in the direction Y, then the transverse direction associated with the first and second clearances BP1, BP2 corresponds to that direction Y.

The dimension of the first clearance BP1 is equal to the distance between the outer faces of the perspective grids 56 of the two assemblies 40 in the transverse direction, for a given position in the axial direction Z. By convention, the dimension of the second clearance BP2 is equal to the distance between the centers of the two respective peripheral rods 46 of the two fuel assemblies 40, for a given position in the axial direction Z.

A method of determination of a nuclear core loading pattern of the nuclear reactor 10 according to the present disclosure will now be described using the flowchart of FIG. 4.

In a first step 101, at least one potential core loading patterns is defined.

In particular, the definition of the or each potential core loading pattern is carried out as a function of the characteristics of the next operation cycle and of the fuel assemblies 40 and as a function of the design safety limits of the core 12.

The characteristics of the next operation cycle are for example the cycle length, the expected output power of the reactor 10 during the cycle, the temperature program in the core 12 during the operation cycle.

The characteristics of the fuel assemblies 40 are for example the fuel composition of the fuel assemblies 40 during previous irradiation(s) or the intensity during previous irradiation(s) of the fuel assemblies 40.

The core 12 design safety limits are for example limits on the core local power, the primary fluid temperature or the reactivity of the fuel assemblies 40.

Advantageously, a plurality of core loading patterns is defined. The plurality of core loading patterns comprises preferably at least four core loading patterns, notably more than ten core loading patterns.

Then in a second step 102, a calculation of the bowing of each fuel assembly 40 at the end of the operation cycle is carried out respectively for each core loading pattern defined in the core loading pattern definition step.

In particular, the bowing is calculated along the transverse directions X and Y.

The calculation is carried out by an automatic learning algorithm trained on an existing training data set comprising a plurality of loading patterns and, for each of them, the measures of bowing of fuel assemblies 40 at the end of cycle.

In particular, the automatic learning algorithm is based on a neural network comprising neurons or neural nodes typically organized into multiple layers.

The automatic learning method is based, for example, on a model using a statistical approach in order to improve the performance of this method in solving tasks without being explicitly programmed for each of these tasks.

Automatic learning has two phases. The first phase consists in defining a model from the data present in the data set, called training. This so-called training phase is generally carried out before the practical use of the model.

The second phase corresponds to the use of the model: each potential core loading pattern defined in the core loading pattern definition step is submitted as new input to the model and the model calculates at least a predictive bowing of the fuel assemblies 40 associated to the corresponding core loading pattern.

The training dataset comprises data issued from fuel assemblies 40 burned during operation in the nuclear reactor 10 or in another nuclear reactor, preferably other reactors having characteristics identical or similar to that of reactor 12, preferably other reactors of the same conception.

As a variant or in complement, the data are issued from fuel assemblies 40 during laboratory tests.

As a variant or in complement, the data are issued from bowing calculations carried out on fuel assemblies 40, for example finite elements mechanical calculations and coupled fluid-structure Computer Fluid Dynamics (CFD) calculations.

Then, in a step 103, the method comprises a step of evaluation of the predictive bowings of the fuel assemblies 40 on at least one predetermined criteria.

Criteria can be defined based on optimal thermal hydraulic of the coolant fluid into the core in operation and/or based on capability of serviceability during outage and/or based on nuclear safety requirements, and/or on mechanical integrity of the assemblies, etc.

The evaluation is based on one single criterion or on a combination of criteria.

In particular, at least one predetermined criterion is chosen among the group consisting in:
  maximal clearance BP1, BP 2 between two fuel assemblies 40, for example to take into account optimal thermal hydraulic of the primary coolant into the core in operation (water gap)
  minimum clearance BP1, BP 2 between two fuel assemblies 40, for example to take into account capability of serviceability during outage (grid interlocking).
  maximal bowing amplitude of each fuel assemblies 40, and
  average bowing severity of each fuel assembly 40.

The evaluation can be based on comparison of predictive bowings features with acceptable thresholds of at least one of the predetermined criteria.

Then in a next step 104, the potential core loading pattern corresponding to the predictive bowing that has the best evaluation is selected as the core loading pattern to be implemented in the next operation cycle.

In an embodiment, the evaluation can be based on an additional calculation using the predictive bowing of one or all the fuel assemblies 40 of the nuclear reactor 10 as input such as an additional calculation of the control clusters drop time test.

As a variant in a global step 105, the criteria, the predictive bowings of the fuel assemblies 40, and their associated core loading patterns are part of the inputs of an optimizer model for evaluation/selection that has its own calculation algorithm to propose the optimal core loading pattern as output.

The selection of the best loading pattern is based on the predictive bowing calculations and on the at least one predetermined criteria. Advantageously, the selection is also based on others technical criteria such as the characteristics of the next operation cycle, the characteristics on the fuel assemblies 40 or the design safety limits of the core 12 and also others economic criteria such as the fabrication cost of each potential loading pattern.

In case that none of the core loading patterns comply with the predetermined criteria, the method comprises a new iteration of steps 101 to 103 with at least a different potential core loading pattern.

Finally, following the selection of one of the core loading patterns, the loading of the fuel assemblies 40 in the nuclear core 12 is carried out according to this selected core loading pattern.

The nuclear reactor 10 can then produce electricity during the next operation cycle.

One can thus see that the method for determination according to the present disclosure enables to take better in account the constraints due to the fuel assemblies 40 deformation.

In particular, the present disclosure enables to choose a core loading pattern minimizing the fuel assemblies 40 deformations and therefore to avoid the grid damage or incomplete rod insertion events and also the disturbances of the power and flow distribution in the core 12.

The present disclosure enables therefore to enhance the reactor 10 safety during operation.

Moreover, the method of determination is carried out quickly, without requiring great calculations means.

What is claimed is:

1. A method of determination of a nuclear core loading pattern defining a disposition of fuel assemblies in the nuclear core for an operation cycle of a nuclear plant, the method comprising at least the following steps:
   defining at least one potential core loading pattern;
   calculating predictive bowing of the fuel assemblies at an end of the operation cycle for each potential core loading pattern, the calculation being carried out by an automatic learning algorithm trained on a training data set comprising a plurality of other core loading patterns and, for each of the other core loading patterns, measurements of bowing of fuel assemblies at the end of cycle;
   evaluating the at least one potential core loading pattern based on the predictive bowing calculations and at least one predetermined criteria; and
   selecting one of the potential core loading patterns based at least in part on the evaluating of the at least one potential core loading pattern.

2. The method according to claim 1, wherein, after the evaluating of the at least one potential core loading pattern, if the evaluation fails, the method comprises repeating of the defining, calculating and evaluating steps, with at least one different potential core loading pattern.

3. The method according to claim 1, in which a plurality of potential core loading patterns are defined, the step of selecting of one of the potential core loading patterns being based at least on the predictive bowing calculations and on the at least one predetermined selection criteria.

4. The method according to claim 1, wherein the defining of the at least one potential core loading pattern is carried out as a function of characteristics of the operation cycle and of the fuel assemblies and as a function of core design safety limits.

5. The method according to claim 1, wherein at least one of the predetermined criteria is chosen among the group consisting of:
   a minimal and/or maximal clearance between two fuel assemblies of the fuel assemblies;
   a maximal bowing amplitude of each fuel assembly of the fuel assemblies; and
   an average bowing severity of each fuel assembly of the fuel assemblies.

6. The method according to claim 1, wherein the plurality of potential core loading patterns comprises at least four core loading patterns.

7. The method according to claim 6, wherein the plurality of potential core loading patterns comprises more than ten core loading patterns.

8. The method according to claim 1, wherein the training data set comprises data issued from fuel assemblies burned during operation in a nuclear plant.

9. The method according to claim 1, wherein the training data set comprises data issued from bowing calculations carried out on fuel assemblies.

10. The method according to claim 1, in which the automatic learning algorithm is based on a neural network.

11. The method according to claim 1, wherein the training data set comprises data issued from bowing calculations carried out on fuel assemblies using finite elements mechanical calculations and coupled fluid-structure Computer Fluid Dynamics calculations.

12. A non-transitory computer-readable medium including a computer program product including software instructions which, when executed by a computer, carry out the method according to claim 1.

13. A method of loading fuel assemblies in a nuclear core, comprising at least the following steps:
   selecting a core loading pattern using the method according to claim 1; and
   loading the fuel assemblies in the nuclear core according to the selected core loading pattern.

* * * * *